(12) United States Patent
Edwards, III et al.

(10) Patent No.: US 8,014,388 B2
(45) Date of Patent: Sep. 6, 2011

(54) USING A DUAL PURPOSE PHYSICAL LAYER INTERFACE FOR A FLEXIBLE CHASSIS-BASED SERVER

(75) Inventors: James William Edwards, III, Austin, TX (US); Thao M. Hoang, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 532 days.

(21) Appl. No.: 11/401,598

(22) Filed: Apr. 11, 2006

(65) Prior Publication Data

US 2007/0237127 A1    Oct. 11, 2007

(51) Int. Cl.
*H04L 12/50*    (2006.01)
(52) U.S. Cl. ................. 370/360; 370/463; 710/100
(58) Field of Classification Search .................. None
See application file for complete search history.

(56) References Cited

U.S. PATENT DOCUMENTS

| | | | |
|---|---|---|---|
| 6,108,345 A * | 8/2000 | Zhang | 370/445 |
| 6,854,015 B2 * | 2/2005 | McCormack et al. | 709/227 |
| 7,222,313 B2 * | 5/2007 | Bullis et al. | 716/3 |
| 7,339,786 B2 * | 3/2008 | Bottom et al. | 361/686 |
| 7,391,771 B2 * | 6/2008 | Orava et al. | 370/389 |
| 2004/0107375 A1 * | 6/2004 | Anglada | 713/400 |
| 2005/0108582 A1 * | 5/2005 | Fung | 713/300 |

* cited by examiner

*Primary Examiner* — Hassan Phillips
*Assistant Examiner* — Robert C Scheibel
(74) *Attorney, Agent, or Firm* — Patterson & Sheridan, LLP (57) ABSTRACT

Methods and apparatus for selectively routing traffic from a port in a switch for use in a chassis-based server are provided. The switch may include a flexible physical layer component, allowing traffic from a channel (e.g., an Ethernet channel) to be routed to a connector on a front panel of the switch or to switch cross-connect routing in a backplane of the server system. The routing may be selectable by a user, for example, under software control, allowing flexibility to the user to select the routing that best fits an application, while conserving resources by not requiring a dedicated channel for each routing data path.

22 Claims, 6 Drawing Sheets

USING A DUAL PURPOSE PHYSICAL LAYER INTERFACE FOR A FLEXIBLE CHASSIS-BASED SERVER

BACKGROUND OF THE INVENTION

1. Field of the Invention

The present invention generally relates to chassis-based servers and, more particularly, to providing the flexibility to route data to/from one or more ports to different data paths.

2. Description of the Related Art

Chassis based servers, such as blade servers, generally provide a number of benefits as a result of their physical design and architecture. By sharing resources such as power, cooling, and interconnections through an integrated enclosure or chassis, such systems often eliminate much of the complexity and inefficient overlap of resources of conventional rack-based server systems. For example, by moving power supplies out of individual servers and into the chassis, the number of individual power cables and overall power consumption of the system can be significantly reduced. Chassis-based server systems also take up less area than a comparable rack-based server system, allowing a reduction in necessary floor space.

Further, by providing network connectivity within the chassis, overall cabling cost and complexity may also be significantly reduced. This also simplifies future changes, as the enclosure needs to be wired only once during initial setup and requires little or no additional wiring to accommodate new components. As an example, servers may be added to the system by simply plugging them into available slots and/or old servers may be replaced with new servers, with minimal change in cabling. Chassis-based server systems often provide two or more slots for Ethernet switches, in an effort to provide a redundant network deployment. As is typical in such redundant network deployments, these switches may be connected together. In some cases, these switch interconnections may be efficiently hardwired into the backplane.

Figure 1A:
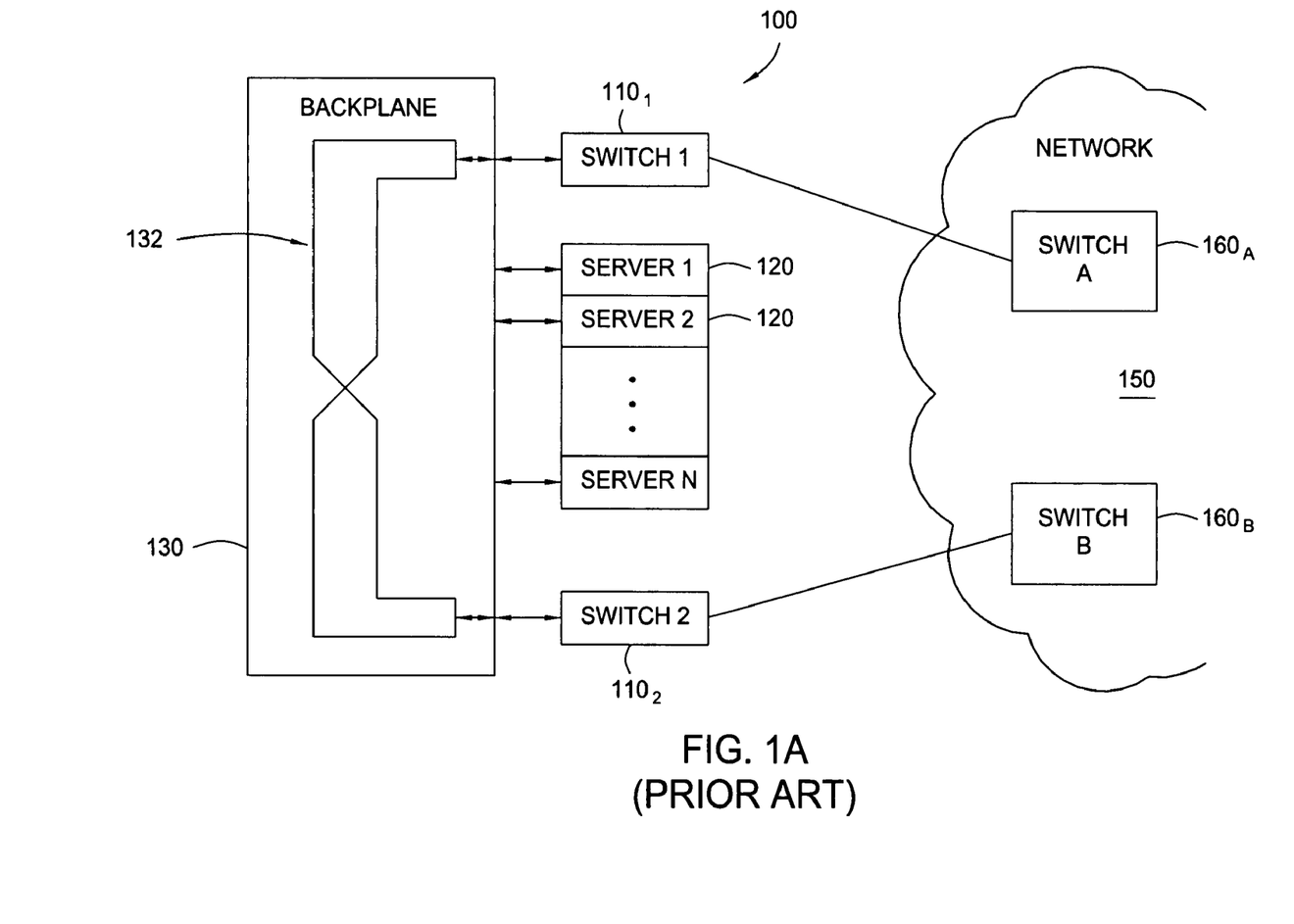
FIGS. 1A and 1B illustrate exemplary chassis-based servers in accordance with the prior art.

FIG. 1A illustrates a chassis-based server system 100 in which a pair of redundant switches 110 (Switch 1 $110_1$ and Switch 2 $110_2$) serve to route network traffic for a plurality of servers 120 connected via a backplane 130. As illustrated, Switch 1 $110_1$ may be connected to a network 150 via an uplink connection to a first network Switch A $160_A$, while Switch 2 $110_2$ may be connected to the network 150 via an uplink connection to a second network Switch B $160_B$. To provide redundancy, the switches 110 may be connected to each other via cross-connects 132 hardwired in the backplane 130. By connecting the switches 110 together, the number of uplink cables and dedicated uplink ports from each switch may be reduced. For example, if the uplink for one of the switches 110 fails, the other switch can take over by rerouting traffic from the switch with the failing uplink to the other switch via the cross-connects 132.

Figure 1B:
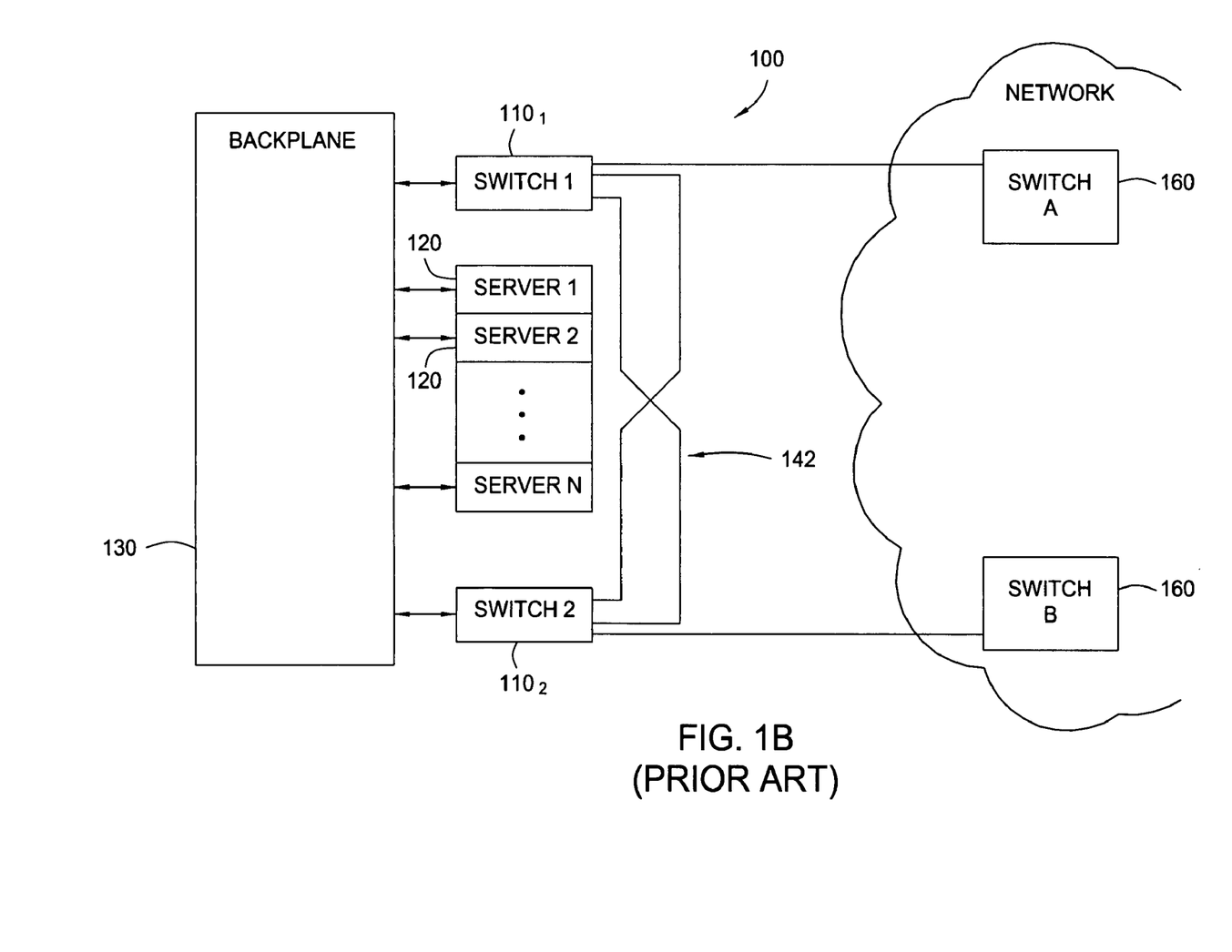

While these cross-connects 132 are important to users that implement redundancy in this manner, some users choose a different approach. As a result, in some cases, unused cross-connects 132 may consume otherwise usable Ethernet channels on the switches 110, which is important as there are only a limited number of channels available on each switch. As illustrated in FIG. 1B, for some applications, switch cross-connects may be removed from the backplane 130, thus freeing up Ethernet channels. A user may still have the option of manually connecting Switch 1 and Switch 2 via external cabling 142 or using these ether channels for another purpose. Unfortunately, this approach diminishes one of the typical advantages of chassis-based servers to minimize cable interconnects. Such cables routed across the servers 120 may have to be removed if a server 120, or switch 110, is added or replaced.

Therefore, there is a need for a flexible routing approach that allows a user the option of implementing switch cross-connects in a backplane without dedicating valuable resources (e.g., Ethernet channels).

SUMMARY OF THE INVENTION

Embodiments of the present invention provide a mechanism for selectively routing traffic from a port in a switch device for use in a chassis-based server.

One embodiment provides a method for selectively routing traffic from a port in a switch device for use in a chassis-based server. The method generally includes determining if a user has enabled backplane switch cross-connection, if the user has enabled backplane switch cross-connection, routing traffic from the port to backplane cross-connects, and, if the user has not enabled backplane switch cross-connection, routing traffic from the port to a connector accessible on an exterior of the switch device.

Another embodiment provides a switch for use in a chassis-based server system generally including an internal switch module with a plurality of ports for routing traffic between devices of the server system and external devices and a physical layer switch configurable to selectively route traffic from at least one of the ports to a backplane or a connector accessible on an exterior of the switch device, depending on a user selection.

Another embodiment provides a chassis-based server system generally including a backplane for routing data between devices mounted to the chassis and at least a pair of switch devices. Each switch device generally includes an internal switch module with a plurality of ports for routing traffic between devices of the server system and external devices, and a physical layer switch configurable to selectively route traffic from at least one of the ports to the backplane for connection to the other switch device or a connector accessible on an exterior of the switch device, depending on a user selection.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally provide methods and apparatus for selectively routing traffic from a port. For some embodiments, a switch for a chassis-based server system may include a flexible physical layer component, allowing traffic from a channel (e.g., an Ethernet channel) to be routed to a connector on a front panel of the switch or to switch cross-connect routing in a backplane of the server system. The routing may be selectable by a user, for example, under software control, allowing flexibility to the user to select the routing that best fits an application, while conserving resources by not requiring a dedicated channel for each routing data path. As a result, users that choose not to use cross-connects, may route the same Ethernet channel to the front panel and use it, for example, as an additional uplink to the network in a traditional manner without the extra cost of an additional channel.

To facilitate understanding, the following description will refer to a blade server as an example of a chassis-based system in which embodiments of the present invention may be used to advantage. However, those skilled in the art will recognize that embodiments of the present invention may be applied in a variety of chassis-based server systems and, more generally, to any application in which selectively routing traffic from a single port to different data paths is desirable.

An Exemplary Switch with a Dual-Purpose PHY

Figure 2:
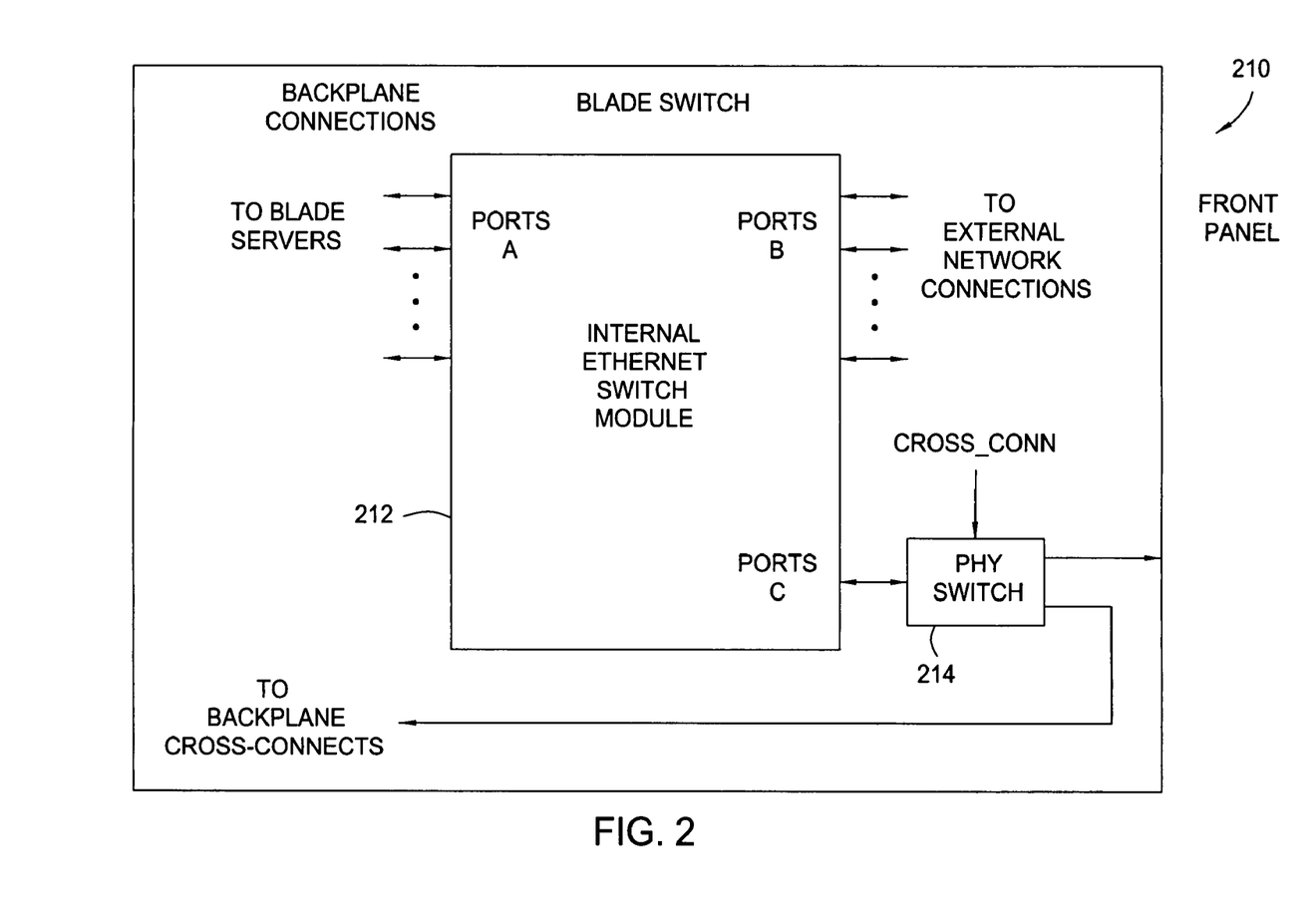
FIG. 2 illustrates an exemplary switch in accordance with one embodiment of the present invention.

FIG. 2 illustrates an exemplary switch 210 in accordance with one embodiment of the present invention that may be utilized in a chassis-based server system. For example, the switch 210 may be utilized in a blade server system such as that shown in FIG. 1A, to switch network traffic between blade servers and/or between another switch, depending on the user-selectable configuration of the switch, as described herein.

As illustrated, the switch 210 may include an internal switch module 212 (e.g., an Ethernet switch module) that may be implemented, for example, as an application specific integrated circuit (ASIC) device, or other type suitable device. The internal switch module 212 may be configured to route data on a plurality of channels between servers, external network connections, and to other switches via a backplane cross-connect. As illustrated, a first set of channels (ports A) may be dedicated to communication with servers via the backplane. A second set of channels (ports B) may be dedicated to external network connections and routed to connectors, such as RJ-45 and/or small form-factor pluggable (SFP) at a front panel of the switch 210.

A third type of channel (port C) may be selectively routed to either a front panel connector or to a backplane cross-connect, via a physical layer "PHY" switch 214. For some embodiments, the PHY switch 214 may be user configurable, for example, by writing to a configuration register within the PHY switch 214. For other embodiments, the PHY switch 214 may be configurable, for example, via an external signal (CROSS_CONN) to enable switch cross-connects by routing the channel (port C) to the backplane or disable switch cross-connects by routing the channel to a connector on the front panel. For some embodiments, the CROSS_CONN signal may be controlled via hardware, such as a switch accessible to a user (e.g., via the front panel). For other embodiments, the CROSS_CONN signal may be changed under software control, for example, via a command line or graphical user interface (GUI) accessible to a network administrator.

Figure 3:
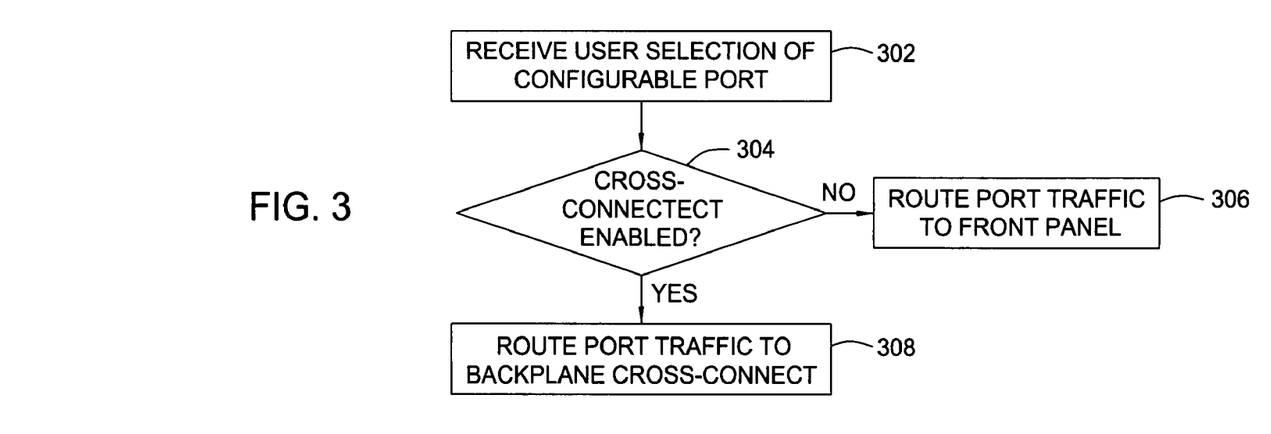
FIG. 3 is a flow diagram of exemplary operations for selectively routing network traffic, in accordance with embodiments of the present invention.

FIG. 3 is a flow diagram of exemplary operations for selectively routing network traffic via the PHY switch 214, in accordance with embodiments of the present invention. The operations of FIG. 3 may be understood with simultaneous reference to FIGS. 4A and 4B, which illustrate routing network traffic through the PHY switch 214 with backplane switch cross-connects enabled and disabled, respectively.

Figure 4A:
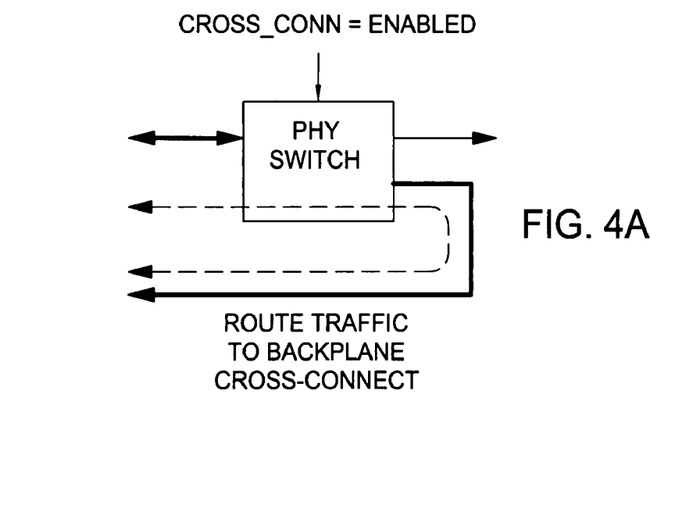
FIGS. 4A and 4B illustrate routing network traffic to a backplane cross-connect and a switch front panel, respectively, in accordance with one embodiment of the present invention.
Figure 4B:
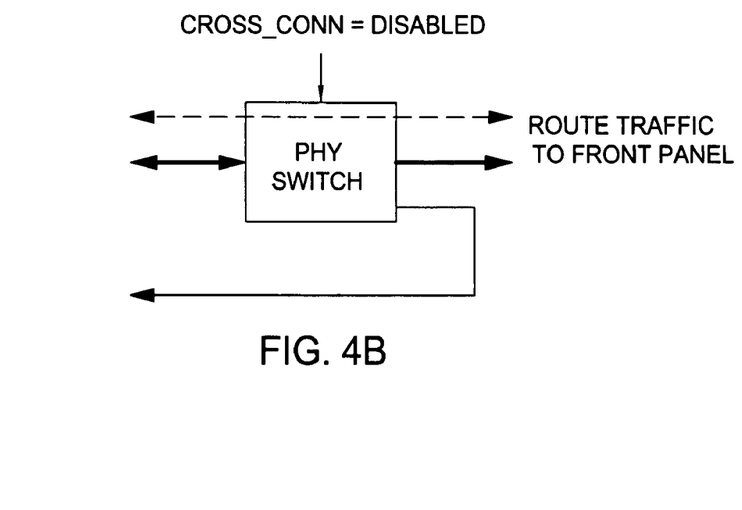

The operations begin, at step 302, by receiving user selection of the configurable port (e.g., by reading a switch or getting the software configured bit). If cross-connection is enabled, as determined at step 304, traffic from the port is routed to the backplane cross-connect, at step 308. As shown in FIG. 4A, with cross-connects enabled (e.g., CROSS_CON=ENABLED via an external signal or configuration register), internal circuitry of the PHY switch 214 may be controlled to route port traffic to/from the backplane cross-connect. On the other hand, if cross-connection is disabled, as traffic from the port is routed to a connector on the front panel, at step 306. As shown in FIG. 4B, with cross-connects disabled (e.g., CROSS_CON=DISABLED), internal circuitry of the PHY switch 214 may be controlled to route port traffic to/from a front-panel connector.

Figure 5:
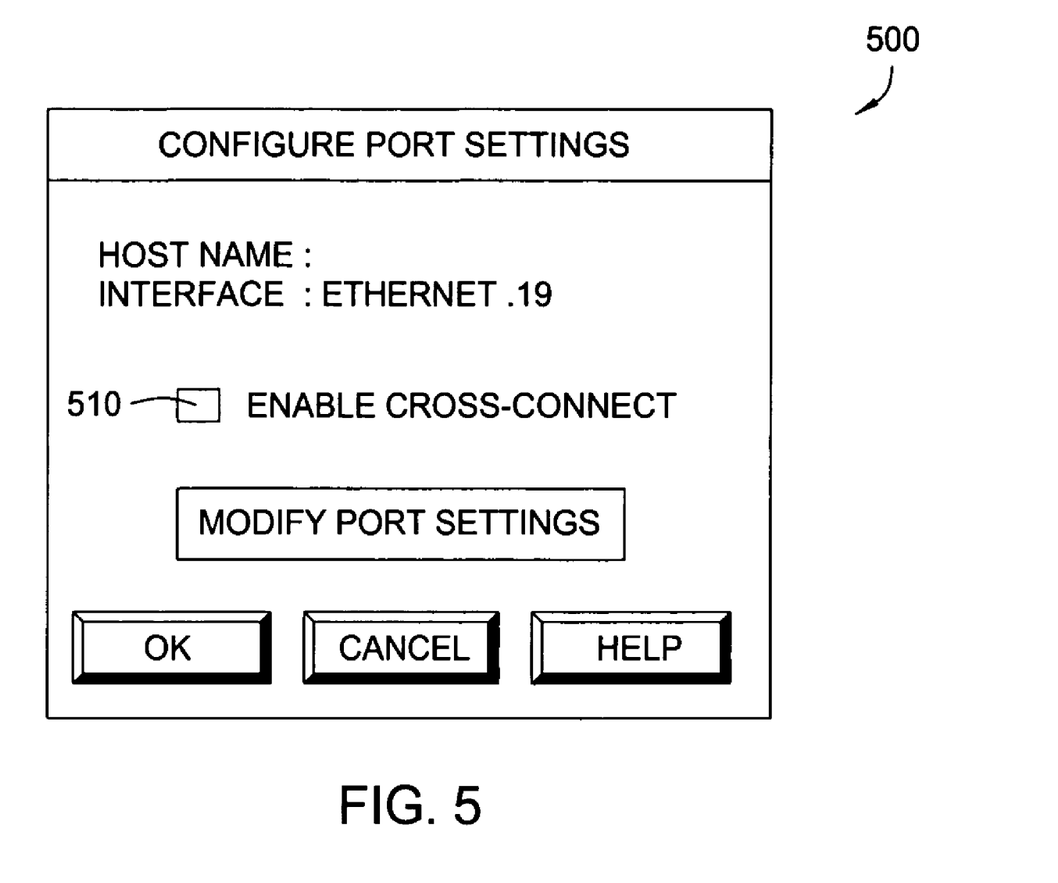
FIG. 5 illustrates an exemplary graphical user interface (GUI), in accordance with one embodiment of the present invention.

For some embodiments, a user (e.g., a network administrator) may be able to configure the PHY switch 214 via a graphical user interface (GUI), such as the GUI 500 shown in FIG. 5. As illustrated, the user may be able to simply select whether switch cross-connects should be enabled or disabled, for example, via a checkbox 510. In response, appropriate bits in one or more initialization packets may be set to appropriate levels to set the control signal to the desired state upon switch initialization or a later change in switch configuration. The GUI 500 may also allow other port settings to be modified via one or more other GUI screens (not shown).

For example, for some embodiments, a PHY switch may be configured via software control to allow a single Ethernet channel to be selectively routed to two or more different types of connectors. Such a switch may be utilized with any of one or more channels routed to external connectors, for example, to choose whether a corresponding channel is routed to a (copper) Ethernet connection via an RJ-45 connector or to a Fiber Channel (or other type optical) connection via an SFP connector.

Figure 6:
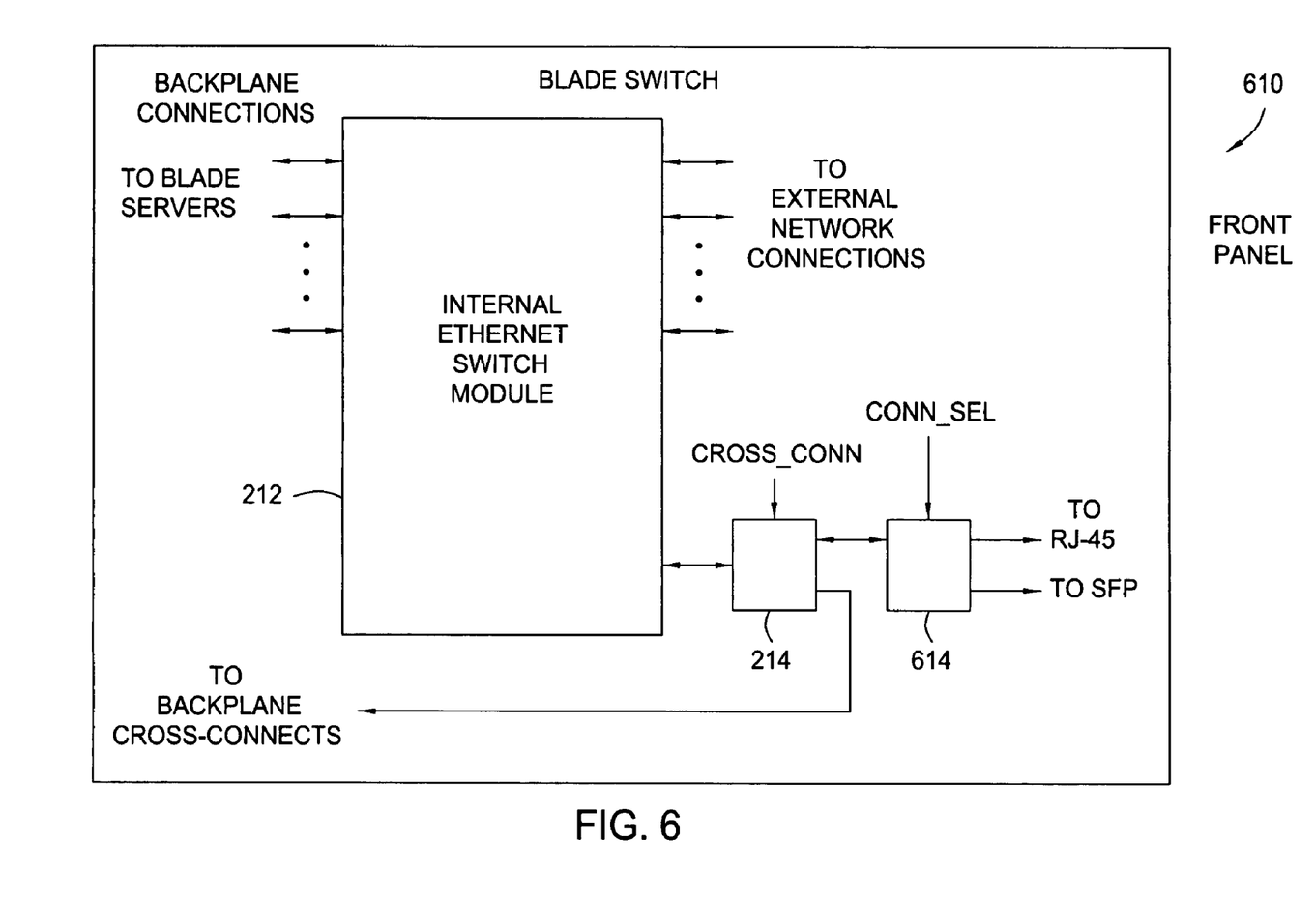
FIG. 6 illustrates another exemplary chassis-based server in accordance with one embodiment of the present invention.

As illustrated in FIG. 6, for some embodiments, such a switch may be used in conjunction with a PHY switch used to enable/disable backplane cross-connects. For example, by placing a PHY switch 614 in series with the PHY switch 214, a user may select to which connector the port C channel is routed in the event that backplane cross-connects are disabled. As illustrated, a separate signal (shown as CONN_SEL) may be utilized to select whether the channel is routed to one type of connector (e.g., an RJ-45 connector) or another type of connector (e.g., an SFP connector).

CONCLUSION

A switch module with a user controllable physical layer (PHY) switch may allow a user to select whether a channel is routed to a backplane for cross-connection with another switch module or to a connector for an external network connection. As a result, users that do not wish to enable switch cross-connects for a chassis-based server may effectively gain an additional external network connection (e.g., uplink) without the associated cost of an additional channel.

While the foregoing is directed to embodiments of the present invention, other and further embodiments of the invention may be devised without departing from the basic scope thereof, and the scope thereof is determined by the claims that follow.

What is claimed is:

1. A method for selectively routing traffic from a backplane cross-connection port in an internal switch module of a first switch device for use in a blade server system, comprising:
    determining whether backplane cross-connection between the first switch device and a second switch device has been selectively enabled through configuration by a user via at least one of a software configurable bit and a user-selectable switch, wherein the blade server system comprises a backplane and a plurality of servers connected via the backplane, wherein the backplane comprises backplane cross-connects between the first switch device and the second switch device, and wherein the first switch device and the second switch device route traffic for the plurality of servers of the blade server system;
    if backplane cross-connection has been enabled, routing traffic from the backplane cross-connection port in the first switch device to the second switch device via the backplane cross-connects of the backplane of the blade server system; and
    if backplane cross-connection has not been enabled, routing traffic from the backplane cross-connection port in the first switch device to a network via a connector accessible on an exterior of the first switch device, thereby providing the blade server system an uplink to the network via the backplane cross-connection port and without requiring use of any other port in the internal switch module of the first switch device, when backplane cross-connection has not been enabled by the user.

2. The method of claim 1, wherein determining whether backplane cross-connection has been selectively enabled comprises determining the status of a software configurable bit.

3. The method of claim 1, wherein determining whether backplane cross-connection has been selectively enabled comprises determining the status of a user-selectable switch.

4. The method of claim 1, wherein routing traffic from the backplane cross-connection port to a network via a connector accessible on an exterior of the switch device comprises routing the traffic to at least one of an RJ-45 connector and a small form-factor pluggable (SFP) connector.

5. The method of claim 1, further comprising, if the user has not enabled backplane cross-connection:
    determining if the user has selected to route traffic to a first connector or a second connector; and
    routing traffic from the backplane cross-connection port to the selected first or second connector.

6. The method of claim 5, wherein the first connector is an RJ-45 connector and the second connector is a small form-factor pluggable (SFP) connector.

7. A switch device for use in a blade server system, comprising:
    an internal switch module with a plurality of ports for routing traffic between devices mounted in the chassis of the blade server system and external devices, wherein the blade server system comprises a backplane and the mounted devices, wherein the backplane comprises backplane cross-connects between the switch device and another switch device for routing traffic between the mounted devices and the external devices, and wherein the plurality of ports includes a backplane cross-connection port; and
    a physical layer switch configurable, by a user via at least one of: a software configurable bit and a user-selectable switch, to selectively:
        if backplane cross-connection has been enabled, route traffic from the backplane cross-connection port to the another switch device via the backplane cross-connects; and
        if backplane cross-connection has not been enabled, route traffic from the backplane cross-connection port to a network via a connector accessible on an exterior of the switch device, thereby providing the blade server system an uplink to the network via the backplane cross-connection port as configured by the user and without requiring use of any other port in the internal switch module of the switch device.

8. The switch of claim 7, wherein the physical layer switch is controlled via a software configurable bit indicative of a selected traffic routing.

9. The switch of claim 7, wherein the physical layer switch is configurable to route traffic from the backplane cross-connection port to the backplane cross-connects if so selected by the user.

10. The switch of claim 7, wherein the connector is selected from a group consisting of: an RJ-45 connector and a small form-factor pluggable (SFP) connector.

11. The switch of claim 7, further comprising:
    a second physical layer switch for routing traffic from the backplane cross-connection port to a selected first connector or second connector.

12. The switch of claim 11, wherein the second physical layer switch is controlled via a software configurable bit.

13. The switch of claim 11, wherein the first connector comprises an RJ-45 connector and the second connector comprises a small form-factor pluggable (SFP) connector.

14. The switch of claim 11, wherein the internal switch module comprises a plurality of Ethernet ports for routing traffic between the mounted devices and the external devices.

15. A blade server system, comprising:
    a backplane for routing data between devices mounted to the chassis; and
    at least a pair of switch devices for routing traffic between the mounted devices, each including:
        an internal switch module comprising a plurality of ports for routing traffic between the mounted devices mounted to the chassis and external devices, wherein the plurality of ports includes a backplane cross-connection port; and
        a physical layer switch configurable, by a user via at least one of a software configurable bit and a user-selectable switch, to selectively:
            if backplane cross-connection has been enabled, route traffic from the backplane cross-connection port to the other switch device via the backplane; and
            if backplane cross-connection has not been enabled, route traffic from the backplane cross-connection port to a network via a connector accessible on an exterior of the switch device, thereby providing the blade server system an uplink to the network via the backplane cross-connection port as configured by the user and without requiring use of any other port in the internal switch module of the respective switch device.

16. The system of claim 15, wherein the physical layer switch of the switch devices is controlled via a software configurable bit indicative of the user selection.

17. The system of claim 15, wherein the connector of each switch device is selected from a group comprising an RJ-45 connector and a small form-factor pluggable (SFP) connector.

18. The system of claim 15, wherein each switch device further comprises:
a second physical layer switch for routing traffic from the backplane cross-connection port to a selected first connector or second connector.

19. The system of claim 18, wherein the second physical layer switch of each switch device is controlled via a software configurable bit.

20. The system of claim 18, wherein the first connector comprises an RJ-45 connector and the second connector comprises a small form-factor pluggable (SFP) connector.

21. A switch device for use in a blade server system, comprising:
routing means for routing traffic between devices mounted in the chassis of the blade server system and external devices, wherein the blade server system comprises a backplane and the mounted devices, and wherein the backplane comprises backplane cross-connects between the switch device and another switch device; and
switching means configurable, by a user via at least one of a software configurable bit and a user-selectable switch, for selectively:
if backplane cross-connection has been enabled, routing traffic from a backplane cross-connection port of the routing means to the another switch device via the backplane cross-connects; and
if backplane cross-connection has not been enabled, routing traffic from the backplane cross-connection port of the routing means to a network via a connector accessible on an exterior of the switch device, thereby providing the blade server system an uplink to the network via the backplane cross-connection port as configured by the user and without using any other port in the routing means of the switch device.

22. The switch of claim 21, further comprising configuring means for selecting, under software control, the traffic routing of the switching means.

* * * * *